United States Patent
Lection et al.

(10) Patent No.: US 10,466,474 B2
(45) Date of Patent: Nov. 5, 2019

(54) FACILITATION OF COMMUNICATION USING SHARED VISUAL CUE

(71) Applicant: INTERNATIONAL BUSINESS MACHINES CORPORATION, Armonk, NY (US)

(72) Inventors: David B. Lection, Raleigh, NC (US); Sarbajit K. Rakshit, Kolkata (IN); Mark B. Stevens, Austin, TX (US); John D. Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

(21) Appl. No.: 15/228,311

(22) Filed: Aug. 4, 2016

(65) Prior Publication Data
US 2018/0039076 A1    Feb. 8, 2018

(51) Int. Cl.
*G02B 27/00*    (2006.01)
*G02B 27/01*    (2006.01)
*G06F 3/01*    (2006.01)

(52) U.S. Cl.
CPC ..... *G02B 27/0093* (2013.01); *G02B 27/0172* (2013.01); *G06F 3/011* (2013.01); *G02B 2027/014* (2013.01); *G02B 2027/0141* (2013.01); *G02B 2027/0178* (2013.01)

(58) Field of Classification Search
CPC ............ G02B 27/0093; G02B 27/0172; G02B 2027/0178
See application file for complete search history.

(56) References Cited

U.S. PATENT DOCUMENTS

| | | | |
|---|---|---|---|
| 2006/0197832 A1* | 9/2006 | Yamada | G02B 27/017 348/77 |
| 2009/0187389 A1* | 7/2009 | Dobbins | G06F 3/011 703/6 |
| 2013/0002551 A1* | 1/2013 | Imoto | G06F 3/013 345/158 |
| 2013/0042296 A1* | 2/2013 | Hastings | G06F 21/10 726/1 |
| 2013/0194304 A1 | 8/2013 | Latta et al. | |
| 2013/0293468 A1* | 11/2013 | Perez | G06F 3/033 345/158 |

(Continued)

FOREIGN PATENT DOCUMENTS

| | | |
|---|---|---|
| WO | 2013033842 A1 | 3/2013 |
| WO | 2013112705 A1 | 8/2013 |

(Continued)

OTHER PUBLICATIONS

Ciger et al., "Evaluation of Gaze Tracking Technology for Social Interaction in Virtual Environments," Proceedings of the 2nd Workshop on Modeling and Motion Capture Techniques for Virtual Environments (CAPTECH'04), 2004 (6 pages).

*Primary Examiner* — Nitin Patel
*Assistant Examiner* — Robert M Stone
(74) *Attorney, Agent, or Firm* — Griffiths & Seaton PLLC

(57) ABSTRACT

Embodiments for facilitating communication between users sharing a visual cue. A gaze location of a first user is determined as an approximation in three dimensional space. The gaze location is transmitted to a second user. A gaze focus of the first user based on the determined gaze location is displayed to the second user.

15 Claims, 12 Drawing Sheets

(56) References Cited

U.S. PATENT DOCUMENTS

| | | | |
|---|---|---|---|
| 2014/0368532 A1* | 12/2014 | Keane | G02B 27/017 |
| | | | 345/619 |
| 2014/0368534 A1* | 12/2014 | Salter | G02B 27/017 |
| | | | 345/619 |
| 2015/0123966 A1* | 5/2015 | Newman | G06T 19/006 |
| | | | 345/419 |
| 2015/0153922 A1 | 6/2015 | Ballard et al. | |
| 2015/0193018 A1 | 7/2015 | Venable et al. | |
| 2015/0193982 A1* | 7/2015 | Mihelich | H04W 4/026 |
| | | | 345/633 |
| 2015/0339094 A1* | 11/2015 | Rakshit | G06F 3/1454 |
| | | | 345/2.2 |
| 2016/0018888 A1 | 1/2016 | Buford | |
| 2016/0027218 A1* | 1/2016 | Salter | G02B 27/0172 |
| | | | 345/633 |

FOREIGN PATENT DOCUMENTS

| | | |
|---|---|---|
| WO | 2014043142 A1 | 3/2014 |
| WO | 2015105621 A1 | 7/2015 |

\* cited by examiner

FACILITATION OF COMMUNICATION USING SHARED VISUAL CUE

BACKGROUND OF THE INVENTION

Field of the Invention

The present invention relates in general to computing systems, and more particularly to, various embodiments for facilitating communication between users using shared visual cues by a processor.

Description of the Related Art

In today's interconnected and complex society, computers and computer-driven equipment are more commonplace. Processing devices, with the advent and further miniaturization of integrated circuits have made it possible to be integrated into a wide variety of personal, business, health, home, education, and other devices. Accordingly, the use of computers, network appliances, and similar data processing devices continues to proliferate throughout society.

SUMMARY OF THE INVENTION

Various embodiments for facilitating communication between users sharing a visual cue by a processor, are provided. In one embodiment, by way of example only, a method for facilitating communication between users sharing a visual cue by a processor, is provided. A gaze location of a first user is determined as an approximation in three dimensional space. The gaze location is transmitted to a second user. A gaze focus of the first user based on the determined gaze location is displayed to the second user.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
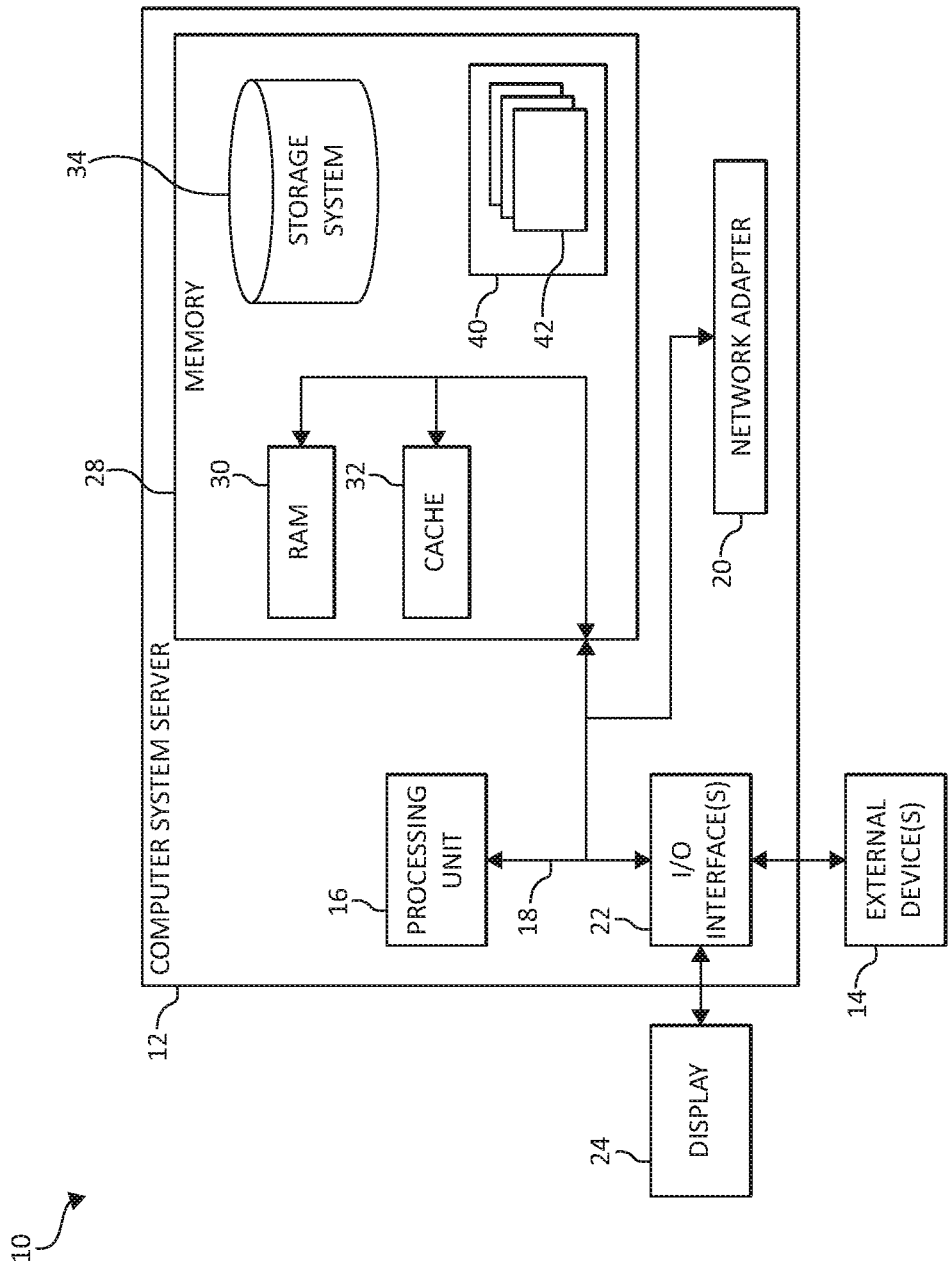
FIG. 1 is a block diagram depicting an exemplary computing node according to an embodiment of the present invention.

In many situations, be it in an educational, vocational, or other setting, a particular individual may identify an object a distance away from the user. The individual may then wish for another individual to also view the same object. For the other individual to view the exact same object, the individual viewing the object is required to explain the exact position of the object to the additional individual. In many cases, directing the additional individual to the exact object may prove to be challenging on the part of the individual viewing the object.

Consider the following example. Two friends are birdwatching in a forested area with trees, shrubs, fallen logs and other objects. The first friend notices a particularly rare bird in a tree at a particular spot. To direct the gaze of the second friend to the appropriate location where the rare bird is residing, the first friend may have to provide several references to the rare bird's location, such as "look to the left of the knot on the second branch of the pine tree at 2:00." The second friend may look in the direction that the first friend specifies, but may still require the use of further references to locate the bird, such as "not the branch with the dead leaves, but the branch above it."

This may be challenging for both the first friend, and the second friend, as the first friend's description may be difficult for the second friend to follow, or the process of providing descriptive information may take some time for both friends to finally be gazing on the same bird. In the process of trying to describe the position of the rare bird to the second friend, the first friend may also become distracted himself, and his own gaze on the object in question may shift (for example, if the first friend shifts his attention from the bird to the second friend in order to point to the object).

In some cases, the rapid identification and synchronization of people on an object may be important for safety, or to minimize the use of additional resources. For example, first responders may have an imperative to locate an individual in distress as quickly as possible without the creation of further distractions that may impair their own or other public safety. A need exists for a mechanism whereby a first person can efficiently share the locus of their gaze to a second person, without the need for the first person to provide additional reference information.

In view of the foregoing, the mechanisms of the illustrated embodiments provide various solutions to the challenges of describing the position of a particular point, focus, area, object, and the like in three dimensional space from one person to another. As will be described, the mechanisms may make determinations as to the focus of the user's gaze, which may also be indicated to the user herself for verification. The user then may share the locus of her eye direction to one or more nearby individuals. In one embodiment, the determination as to the focus of the user's gaze may be determined using hardware incorporated into a head-mounted device, such as glasses or other structures. Further, the user may then share the focus of her gaze to other users using similar hardware (e.g., other head-mounted devices worn by other users). Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. As will be described, functional components of node 10 may even be miniaturized to the extent that they are integrated into wearable components to accomplish various purposes of the illustrated embodiments, such as into headgear, glasses, lenses, contacts, or other wearable components. Cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be integrated into wearable components. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
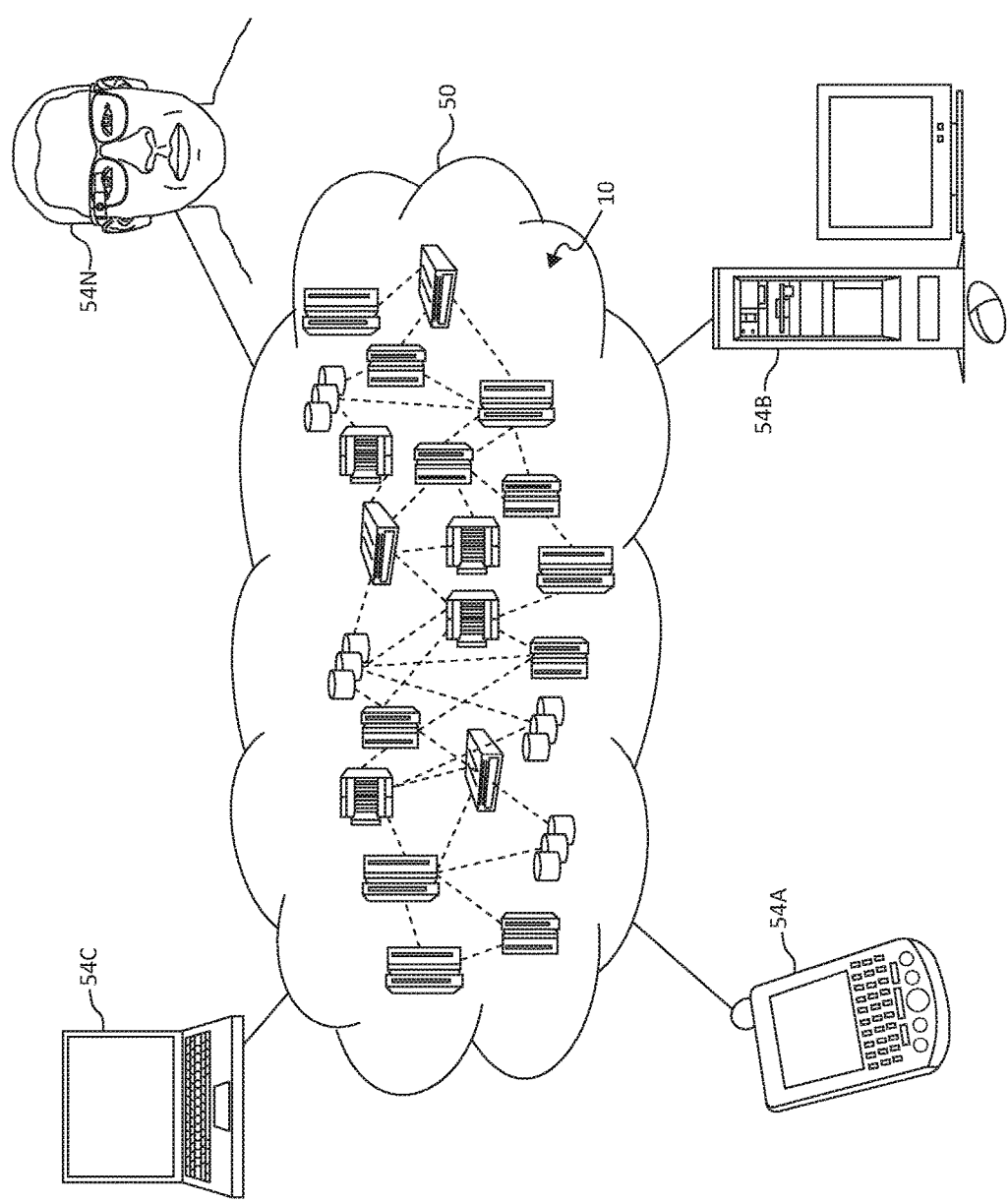
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, smartphone or cellular telephone 54A, desktop computer 54B, laptop computer 54C, and/or wearable computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
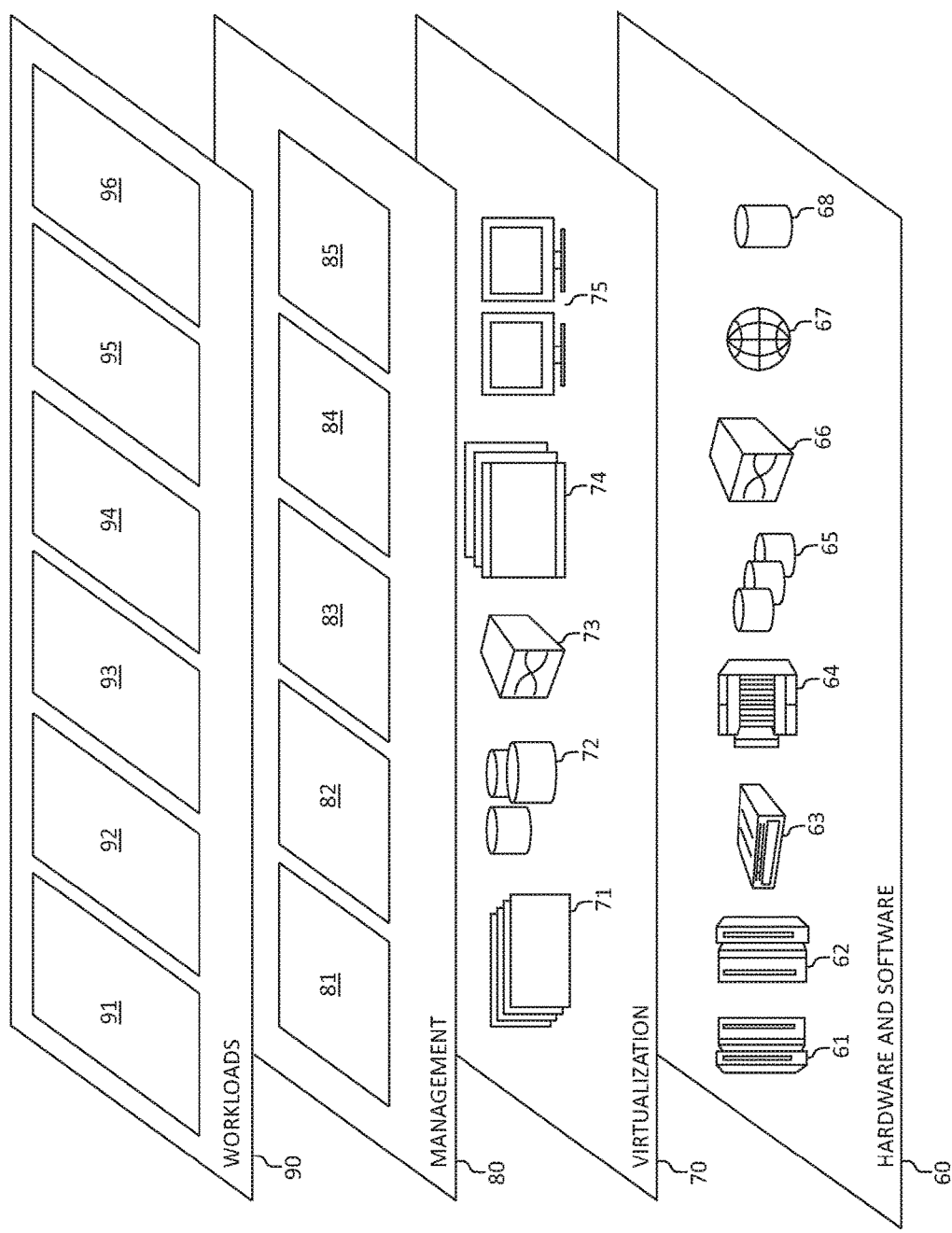
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various visual workloads and functions 96. In addition, visual workloads and functions 96 may include such operations as data analysis (including data collection and processing from various sensors) and data sharing workloads (such as sharing visual information over a network to another user). One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the determination of the locus of a user's gaze, and the sharing of that information to one or more users, along with other related information such as visual, auditory, or other communications as will be described.

Figure 4:
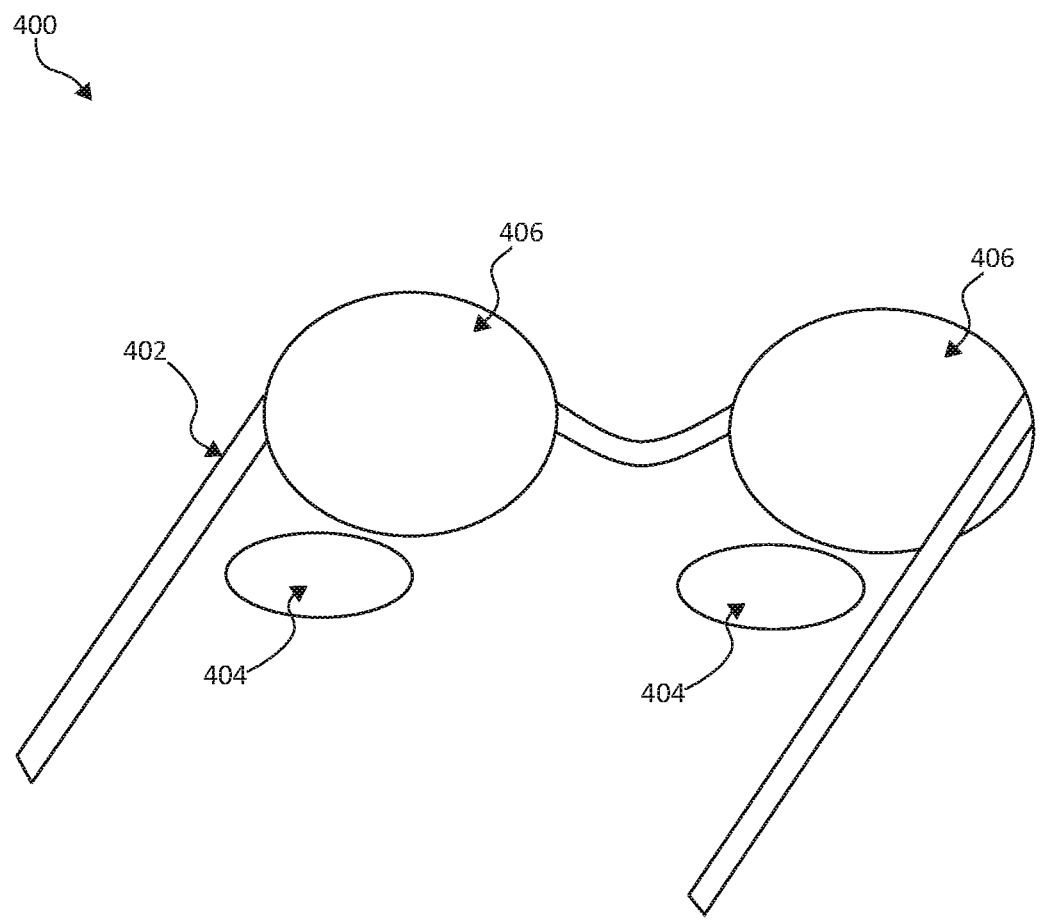
FIG. 4 is an additional block diagram depicting various user hardware components functioning in accordance with aspects of the present invention.

FIG. 4, following, is a block diagram of exemplary wearable functional components 400, such as glasses 402 or headgear 402, in which hardware previously described in FIGS. 1-3, and other functionality provided by the mechanisms of the present invention may be realized. In the depicted embodiment, a user dons the glasses 402 to assist in determining the locus of the user's gaze, designating the locus, and sharing the locus along with other related information to other users having the glasses 402. As will be further described in relation to the depicted embodiment, various sensors (not shown for purposes of illustration) may be used to determine the positioning of the users eyes 204 and associated direction that the eyes 204 are looking. These may include position sensors, Global Positioning System (GPS) receivers, radio transceivers, and the like as one of ordinary skill in the art will appreciate. The lenses 406 in the glasses 402 then assist in visualizing the content to either the user, or shared with other users, who in turn visualize designations of the content in order to locate the object in three dimensional space.

Consider the following example. The user can locate the position of any object in three dimensional space by looking at the object with the user's eyes 404. Thus, with the glasses 402, the user has identified one target object. Gaze point tracking sensors installed in the glasses 402 device then calculate the focal information (direction, focus, etc.) of the target object, and accordingly identify the target object by extrapolation of the direction of view. In additional embodiments, the foregoing methodology may also be used to calculate an approximate distance between the target object and the user in rough order of magnitude.

Figure 5A:
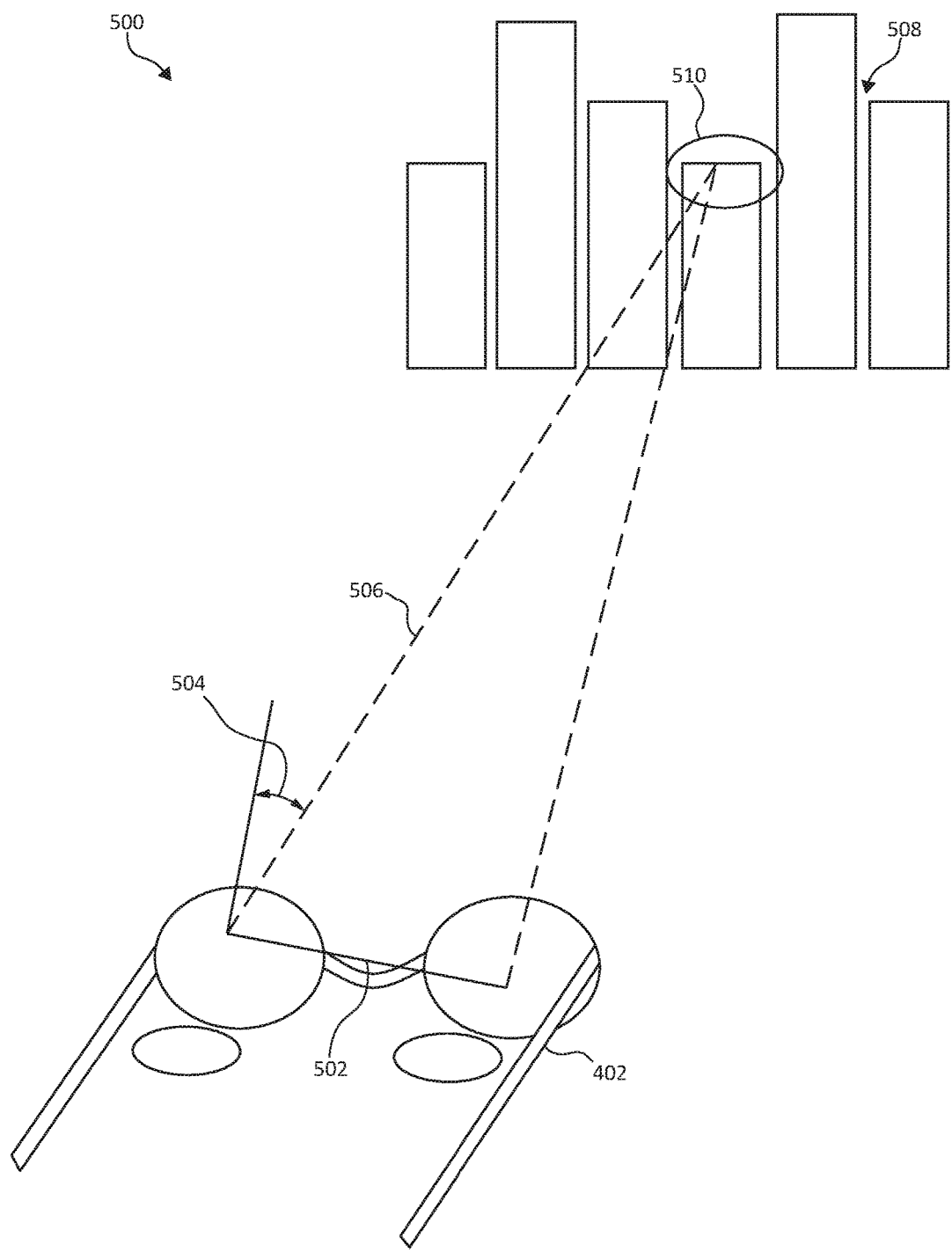
FIG. 5A is an additional block diagram depicting various user hardware components functioning in accordance with aspects of the present invention.

FIG. 5A, following, is an additional block diagram illustrating exemplary operational functionality 500 of the glasses 402 previously depicted in FIG. 4. In the depicted embodiment, a user is focusing their gaze on the selected object 510 as shown, as a portion of a number of potential target objects 508 of their gaze. The mechanisms of the illustrated embodiments then use several measurements to triangulate the selected object, and estimate the location of the target object 510 including an approximated distance from the user.

As shown, the distance between the user's eyes (represented as reference 502) may be determined. In addition, the angle 504 between the angle of focus of the user's eye 404 and normal may similarly be determined. The dotted line 506 thereby represents the extrapolated direction of view from the user's left eye 404 to the selected object 510. A similar extrapolation may be conducted for the direction of view from the user's right eye 404 to the selected object 510. These triangulations (e.g., distance between the user's eyes 404, extrapolated distance between selected object 510, and geolocation of user) may then be used to determine an approximation of the selected object 510 in three dimensional space.

The dotted line 506 may also represent a virtualization of the extrapolation of the eye direction line that may assist the user in finding other extrapolation virtualizations from other users. For example, and as will be further described, the mechanisms of the illustrated embodiments may virtualize the user's eye direction line as a dotted line 506 or other similar virtualization (to indicate to the user the user's eye direction), and also virtualize other dotted lines 506 from other users to the user. The user may then orient their head such that their own eye direction visualization intersects that of another user that the user wishes to communicate with, as will be further described.

Figure 5B:
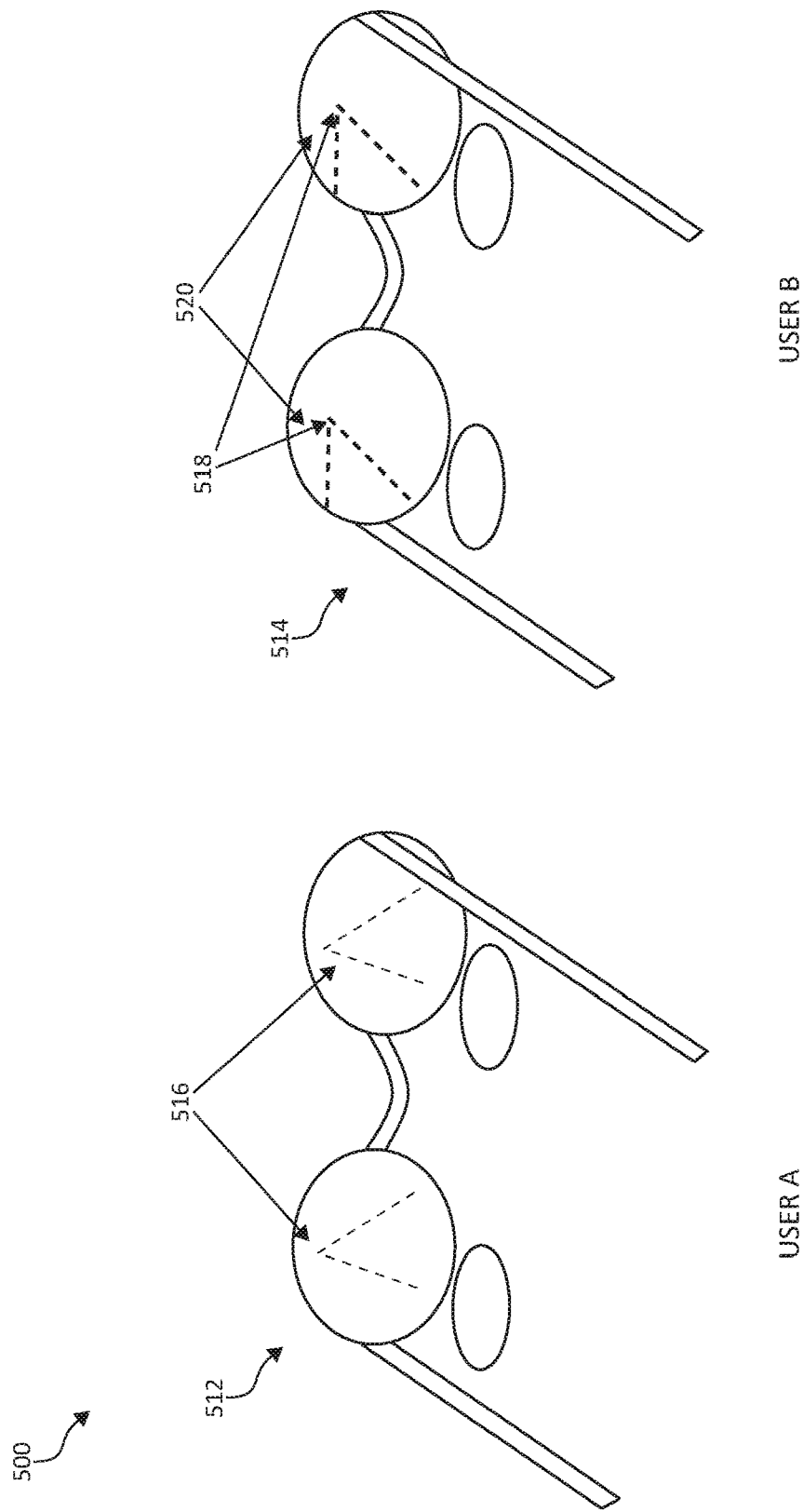
FIG. 5B is an additional block diagram depicting various user hardware components functioning in accordance with aspects of the present invention.

Once the selected object 510's position has been approximated in three dimensional space, the user 512 (i.e., User A) may then share the direction of focus to one or more nearby friends. FIG. 5B, following, is an additional block diagram depicting this exemplary functionality, as in one embodiment, in a user interface (UI), the user has an option to share the locus of his/her focus/target object to his friend. Once the locus of eye direction is shared, then the friend 514 (User B) will also be able to locate the object that user 512 is gazing upon.

As shown, the user 512 may visualize the locus to the user 512's eye direction, and optionally, in an additional embodiment, the locus of the user 512's hand direction, in the lenses 406 of the glasses 402. The visualization 516 (e.g., locus of eye direction) may then be shared with the user 514 as visualization 518, where, in one embodiment, the target object is highlighted (represented by 520).

In view of the foregoing, consider the following exemplary embodiment that may implement various features previously described. Once the user looks at any target (e.g., selected object 510, FIG. 5A), the system may identify a variety of information about the selected object 510, such as current geolocation of the user, using such hardware as a GPS device previously described. Various other sensors may determine the direction of focus of the user, and determine the user's focus using the gaze point tracking device. As previously described, the distance between the target object from the user may then be determined in rough order of magnitude.

Continuing with the exemplary embodiment, the user then has the option to share the target object to one or more associates. In the exemplary embodiment, the user makes use of a User Interface (UI) to share the target object. In alternative embodiments, the user may make a gesture (e.g., eye movement, head movement, wink, blinking a certain number of times, or hand or other body movements) to share the target object to an associate.

Once the user has decided to share the target object with the associate(s), the exemplary embodiment continues to perform various operations on the selected target object. First, the system calculates a projected geocoordinate of the target object in rough order of magnitude. Second, the system then uses object recognition algorithms or similar technologies to recognize the target object and/or capture a section of the image of the target object.

Those associates who are determined not to be in the field of view by the system (identified by the system based on their respective geolocations) are then identified, and are notified to change their field of view. For example, an object might be determined to be between the associate and the selected object, blocking the associate's field of view of the object. The associate is then notified that they must change their position (e.g., by a change in location recommended to the associate by the system).

Continuing the exemplary embodiment further, the system identifies the associate with whom the selected target was shared, and begins a process herein referred to as "geocoordination." The system determines the geolocation of the user/viewer, and the geolocation of the associate. Based on the two locations, the system then varies the notification information to the associate (that may, for example, include a visualization or designation of the selected target).

Figure 6:
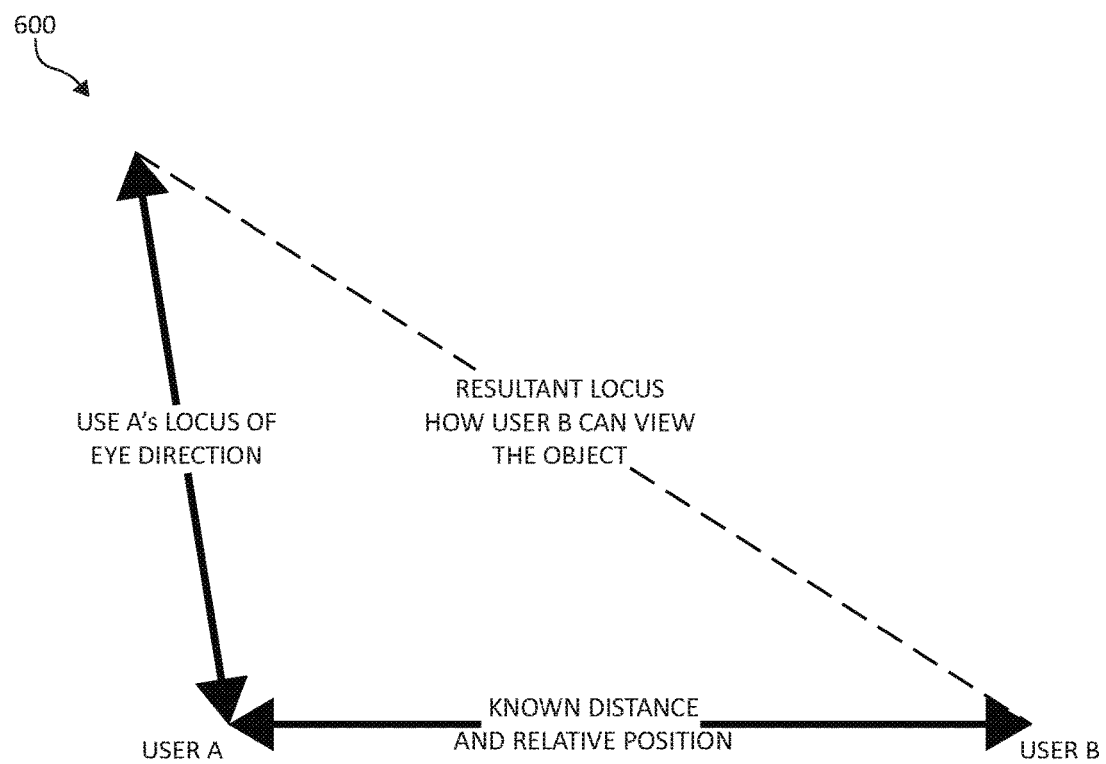
FIG. 6 is an additional block diagram depicting exemplary geocoordination between users, again in accordance with aspects of the present invention.

FIG. 6, following, is an additional block diagram illustrating exemplary geocoordination 600 functionality between two users according to various aspects of the illustrated embodiments. FIG. 6 depicts the selected target object in view of User A (first viewer) as shown. The direction and locus of User A's eye directions are shown by the indicated vertical arrow between User A and the target object.

The computed distance between User A and User B (associate to whom User A wishes to share the target object), and relative position of User B may be determined in a variety of ways. For example, integrated GPS devices in the wearable unit on User B may determine the geolocation of User B, which may be sent to the processing component determining the relative distance between User A and User B (for example, a cloud-based computing component as previously described). Once User A's locus of eye direction is determined, as well as the distance between Users A and B, and relative position of User B from User A as indicated, the system may then calculate the resultant locus of how User B can view the selected object. Accordingly, the system may then vary any indication (such as a circular designator placed around the selected target) presented to the user of the location of the selected object by virtue of the resultant locus of eye direction.

Figure 7:
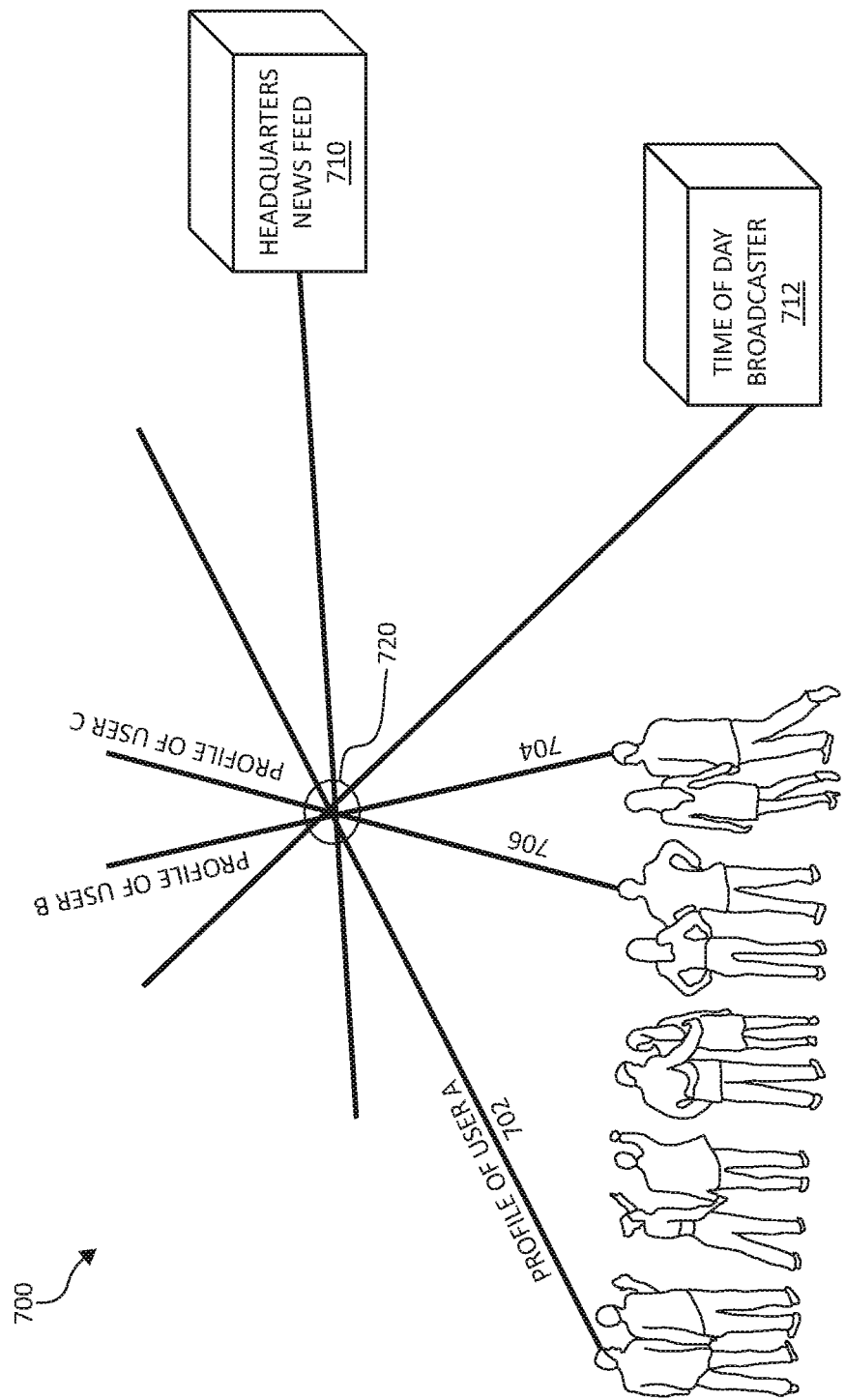
FIG. 7 is an additional block diagram depicting, among other functionality, broadcast functionality associated with various mechanisms of the illustrated embodiments.

Turning now to FIG. 7, an additional block diagram depicting additional functionality 700 associated with the wearable technology utilized in the context of the present invention, is shown. In one embodiment, the wearable devices implemented by users sharing a selected target object may virtualize, to the other users, the extrapolated eye direction of each of the users through a given intersection point 720. For example, a user A profile 702, user B profile 704, and user C profile 706 may each display extrapolations of the profiles 702, 704, and 706 to other shared users. The extrapolated eye direction may be shown, for example, with differing color codes corresponding to each user profile. The intersection point 720 may also be designated appropriately to all users.

In one embodiment, a user may create an eye-catching visualization that is shown by some kind of variation in the displayed user profile, such as a differing line thickness, color, blinking, and the like. As a result, another user may be able to determine that the particular user broadcasting the eye-catching visualization wishes to communicate something to the other users. Accordingly, during communication, other interested users may intersect the extrapolated eye position, and a mutual authentication may be performed to start communication.

In alternative embodiments, in addition to humans establishing communications channels using line of sight foci on a particular area, other devices may use the same technique to establish communications with one or more humans. Returning to FIG. 7, two additional exemplary functional devices are shown, which may contribute information to ongoing communications. A time of day broadcaster 712 may emit information (such as voice, audio, or text) to each person connected via a particular intersection point 720.

The headquarters news feed 710 device may be a two-way device that captures all communication from the particular intersection point 720 and sends the communication via the Internet to a configured location. The configured location may also broadcast messages to all humans connected via the intersection point 720. In addition, other internet-connected devices may also contribute information to a particular conversation. The broadcasted information may again take the form of audio, video, text (text balloon) or other methods that are shared between users.

In additional embodiments, the nature of the intersection point 720 may be altered depending on the nature and sensitivity of a particular communication. For example, a large area intersection point may be used to map the intersection point in less-sensitive communications, and may be designated very large to encompass an entire active scene. Alternatively, hierarchical intersection points may be configured, which, for example, feature smaller points within a large radius. The user may gaze into a larger area and join that particular area. At a subsequent time, another user (or device) in the conversation may want to conduct a private conservation with the first user. Upon opening a new communications channel the smaller point becomes visible to the intended recipients. The recipients gaze into the smaller point, and now have communications in a configured sub-channel. When the sub-channel terminates, the users then return to the higher order communication.

Figure 8A:
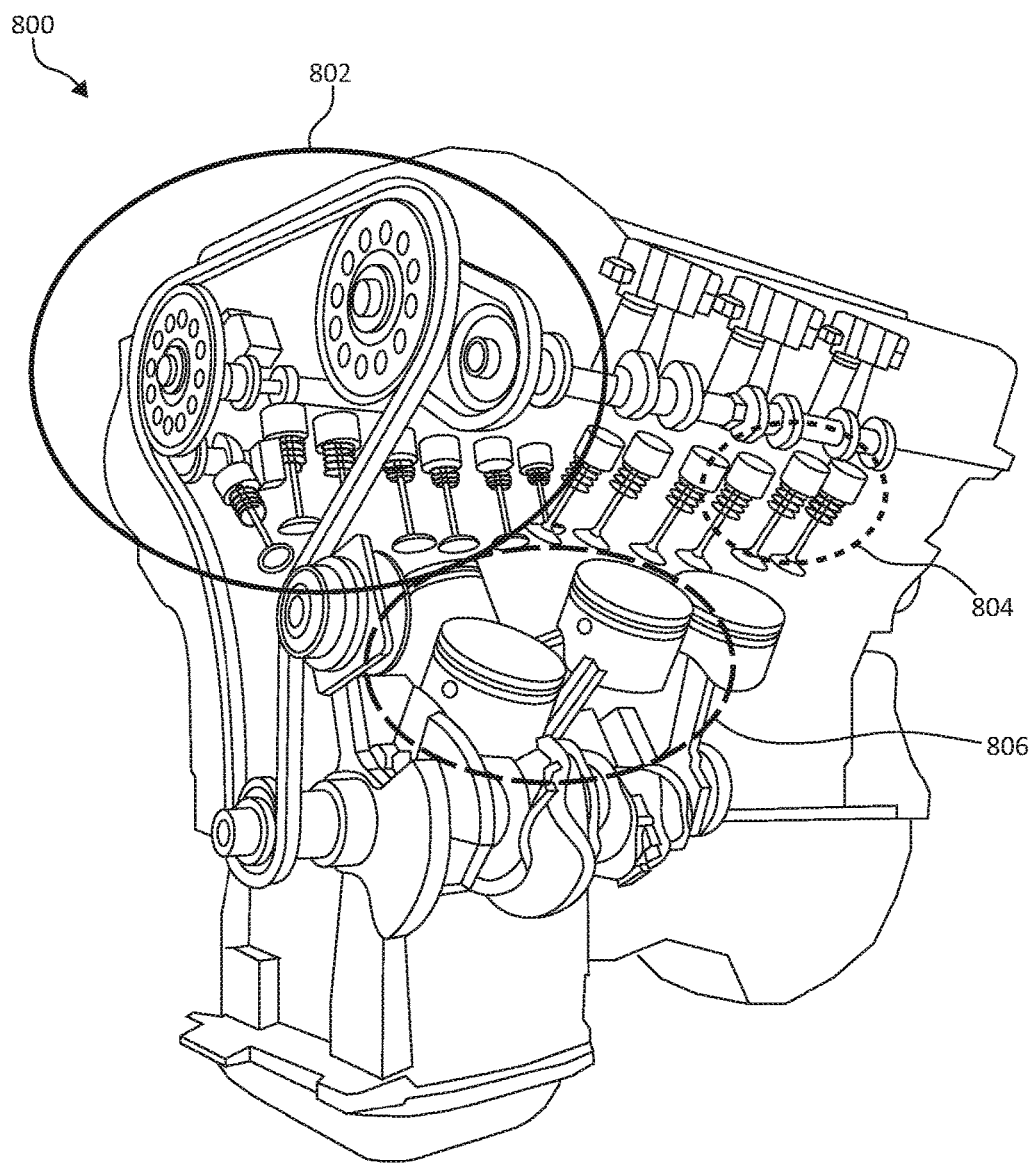
FIG. 8A is an additional block diagram of an additional exemplary embodiment of the present invention, in which various aspects of the present invention may be realized.
Figure 8B:
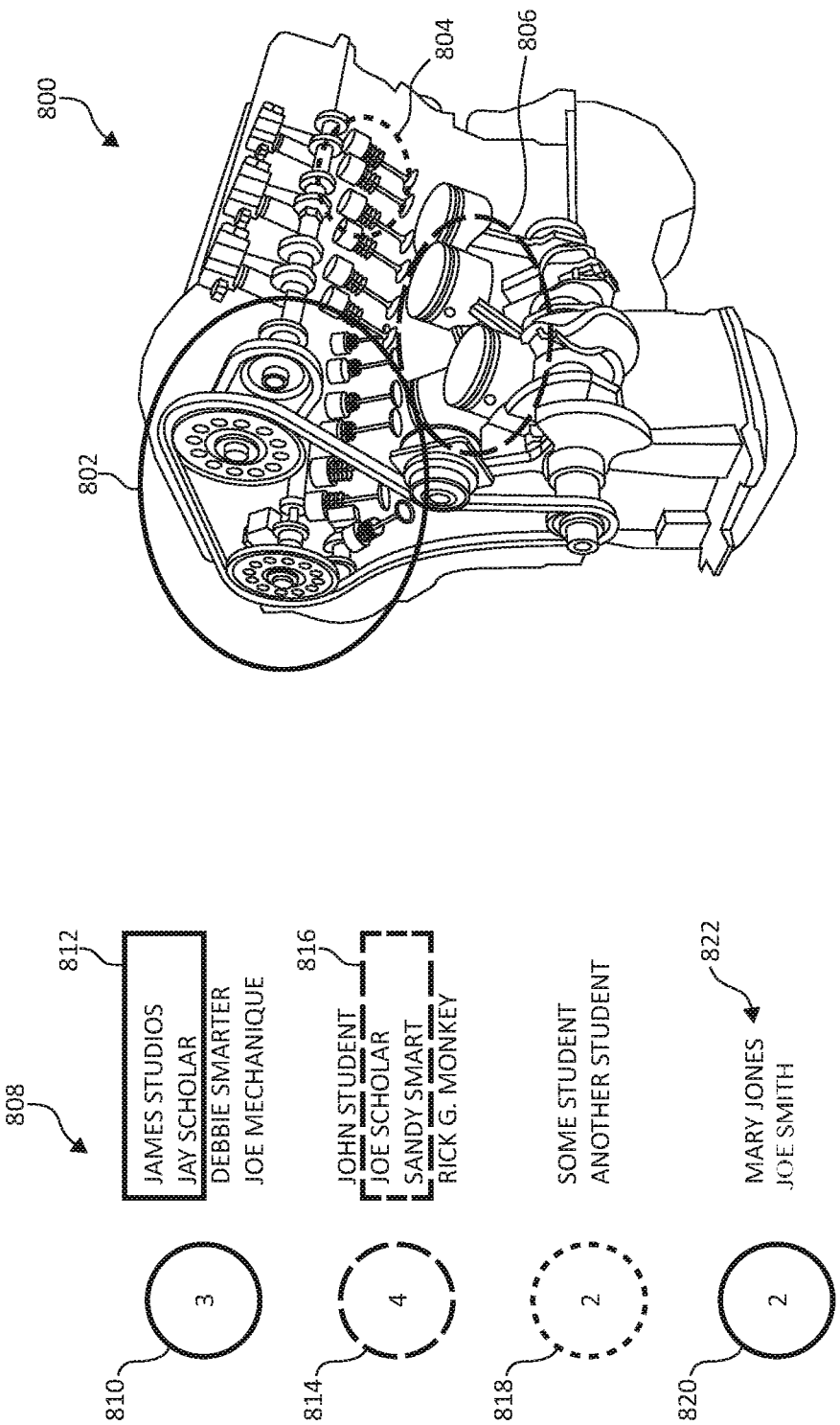
FIG. 8B is an additional block diagram continuing the exemplary embodiment first described in FIG. 8A, previously.
Figure 8C:
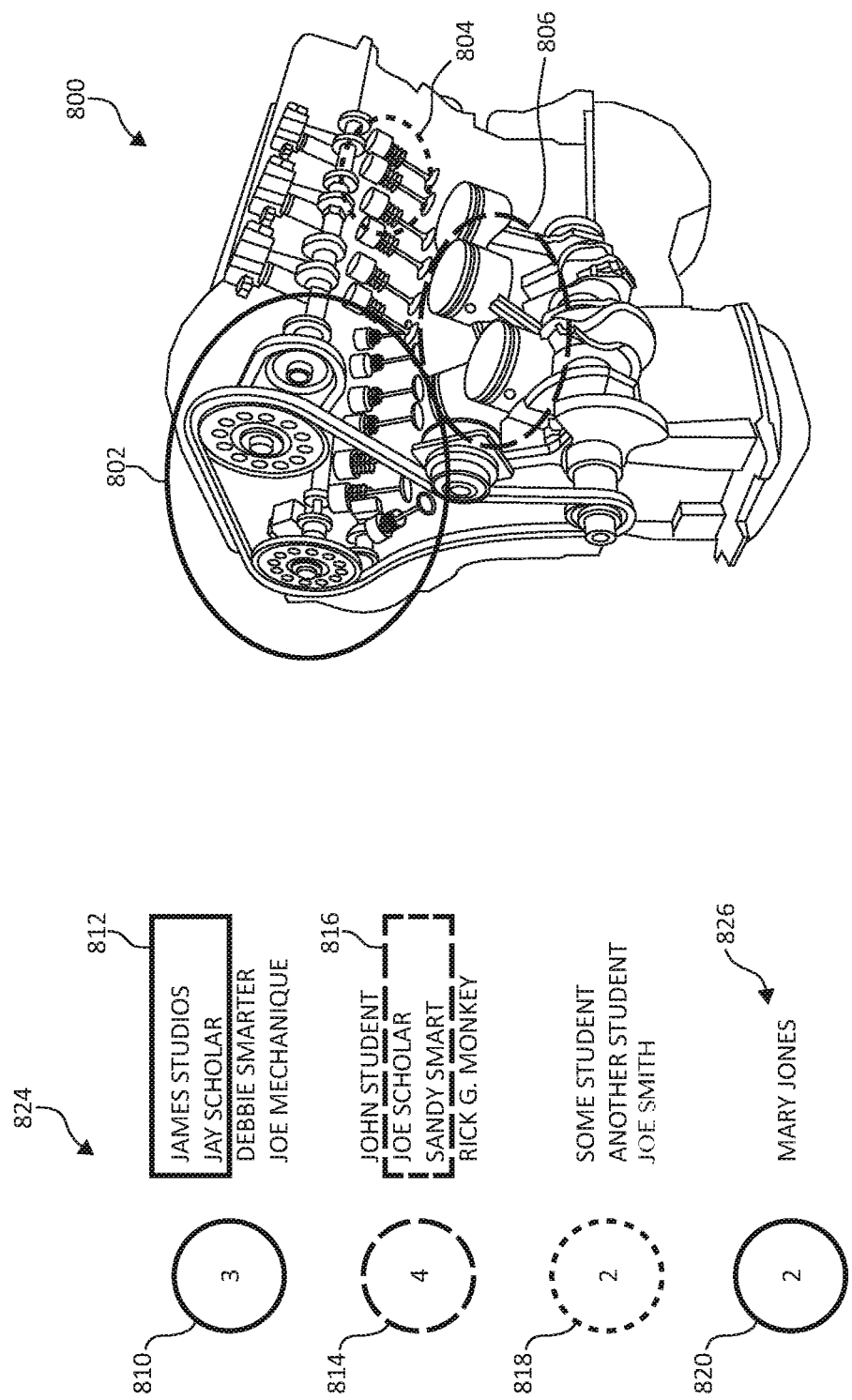
FIG. 8C is an additional block diagram continuing the exemplary embodiment first described in FIG. 8A, previously.

Turning now to FIGS. 8A-8C, additional block diagrams depicting an additional functional example of the implementation of various aspects of the illustrated embodiments, are shown. In the depicted example, a professor at a local university is teaching a mechanical engineering course on combustion engines. The day's class concerns the design of a combustion engine, and an analysis of the major parts of the engine block. FIG. 8A illustrates a teaching system 800 featuring a cutaway block diagram of an engine to be used in the mechanical engineering course.

Imposed on the diagram are three colored circle designations, 802, 804, and 806 that outline various components of the engine 800 as shown. The teaching system 800 also creates three gaze points within each circle 802, 804, and 806 to track students' attention locations, and also to allow students to chat with each other about the component identified by the gaze circle. The teaching system 800 also enables the instructor to understand in real time where the students are focusing, and to determine if any students are not paying attention. As the diagram is displayed to the students, and they begin to focus on the contents, on the professor's desktop computer a similar diagram is depicted in FIG. 8B, following.

FIG. 8B continues to illustrate the teaching system 800 displayed to the students, as well as information regarding the students gaze foci being relayed to the professor. A legend 808 representative of the gaze foci 810, 814, 818, and representative of not focused on the diagram, 820, is shown, along with various student name information. In the depicted example, the teaching system 808 allows students who have focused on the same component, identified by the colored circles (gaze points) to chat via their own respective pc's keyboard and display. James and Jay, who are focused on the timing chain, are discussing the timing chain (as referenced by circle 810 and box 812 as shown). Joe and Sandy are discussing the pistons (as referenced by circle 814 and box 816 as shown).

Based on the legend, the professor takes note that Mary Jones and Joe Smith are not focused on any identified component of the engine. The professor then calls on Joe Smith to explain the function of the intake valves. Joe focuses on the valves and the system recognizes what is now shown in FIG. 8C, following. Upon recognition that Joe has now focused on the valves, the legend 824 changes to indicate that Joe is now gazing on the valves (denoted by circle 818) as displayed to the professor. Mary is still shown not to be gazing on any engine component group previously described (by reference 826). The teaching system 800, may then display information automatically on Joe's computer relating to the operation of the intake valves, such as A valve in the cylinder head of an internal-combustion engine that opens at the proper moment in the cycle to allow the fuel-air mixture to be drawn into the cylinder.

Figure 9:
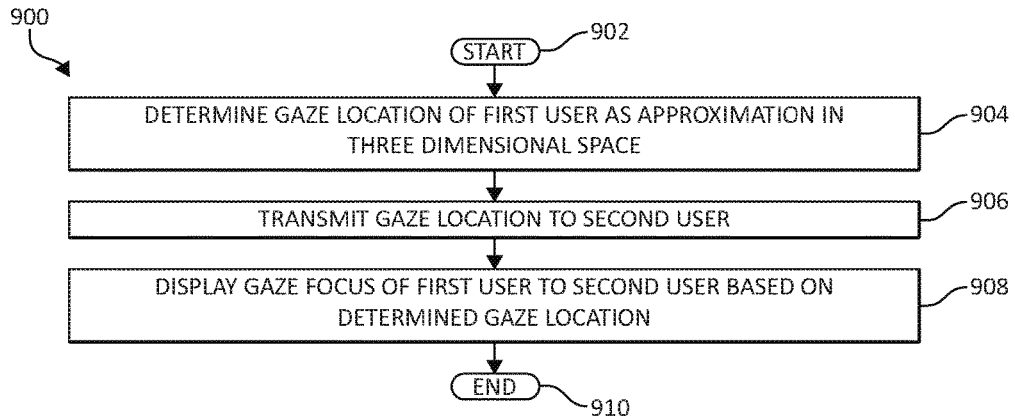
FIG. 9 is a flowchart diagram of an exemplary method for facilitating communications between users, again in which aspects of the present invention may be realized.

Turning now to FIG. 9, a flowchart of an exemplary method 900 for facilitating communication between persons sharing a visual cue, in which various aspects of the illustrated embodiments may be implemented, is depicted. Method 900 begins (step 902), with the determination of a gaze location of a first user as an approximation in three dimensional space (step 904). The gaze location is then transmitted to a second user (step 906). The gaze focus of the first user is displayed to the second user, based on the determined gaze location (step 908). The method 900 then ends (step 910).

Figure 10:
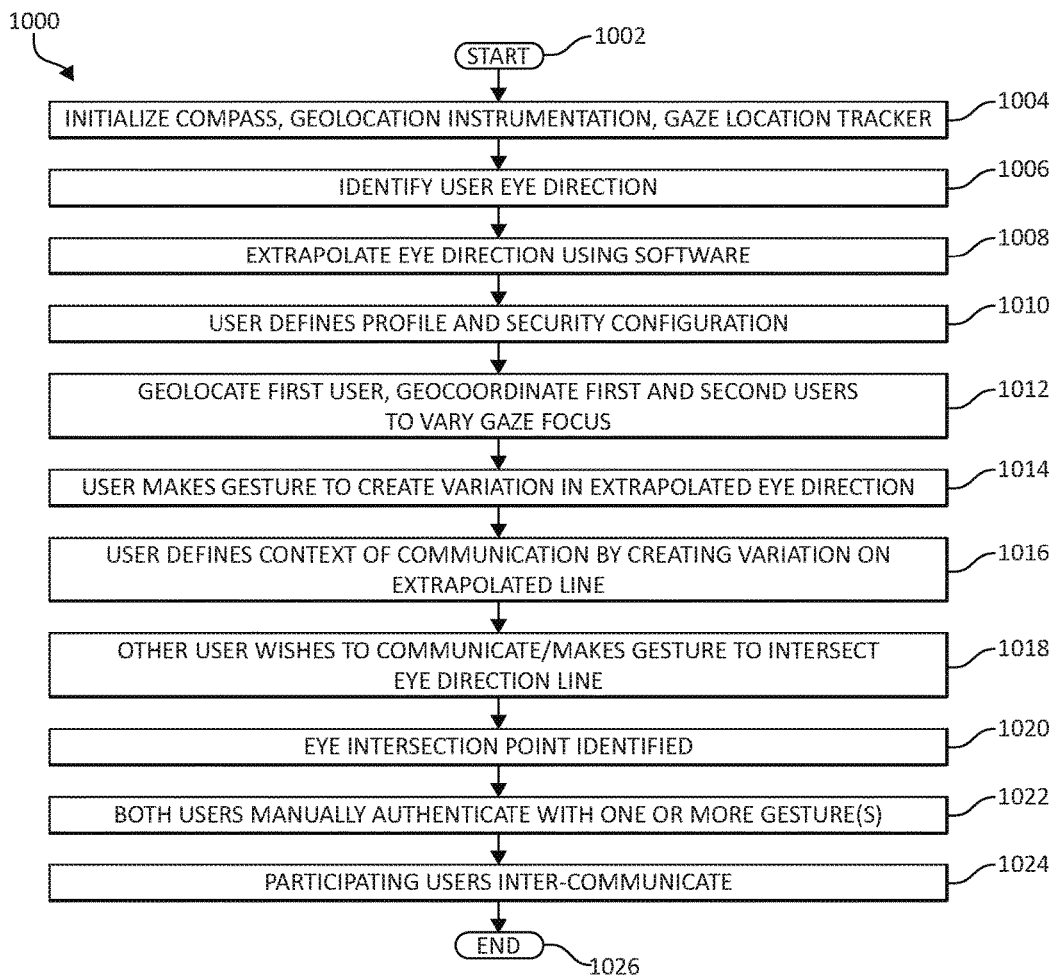
FIG. 10 is an additional flowchart diagram of an additional exemplary method for facilitating communications between users, here again in which aspects of the present invention may be realized.

FIG. 10, following, is an additional flowchart of an exemplary method 1000 for facilitating communication between persons sharing a visual cue, again in which various aspects of the illustrated embodiments may be implemented. Method 1000 begins (step 1002) with the initialization of various sensors integrated into the wearable components (such as compass, geolocation instrumentation, GPS, eye location sensors, and gaze location trackers) (step 1004).

In a subsequent step 1006, the user eye direction gazing on a selected target object is identified. The eye direction is then extrapolated using software (step 1008). The user defines a profile and security configuration (step 1010) associated with the selected target object. If any user wishes to communicate with any other user, the user mutually intersects the eye direction of the other user. The authentication method may be done with an eye-based gesture (e.g., blinking 2 times simultaneously). Any participating user may reject another person's communication request. Multiple participating users may intersect their direction of view and begin communicating with each other.

In a subsequent step, the first user is geolocated, and the participating user(s) are geocoordinated to vary the gaze focus of the first user to the other participating users in a manner previously described (step 1012). The user may make a gesture to create a variation in an extrapolated eye direction (step 1014) to invite other users or define the context of communication by a certain variation on the extrapolated line (step 1016) (e.g., changing thickness, color brightness, or blinking in the extrapolated line). Any user that wishes to communicate may make a similar gesture to intersect the eye direction line (step 1018). The eye intersection point is identified by the system (step 1020). Both users may manually authenticate with one or more gestures (step 1022), and the participating users may inter-communicate (step 1024) such as by voice communications, earphone and microphone communication via hardware integrated in the wearable technology, and other communications. In optional embodiments, users may also apply security on the extrapolated eye direction line visualization previously described. For example, only authorized users may visualize the eye direction extrapolated line. The method 1000 then ends (step 1026).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for facilitating communication between users sharing a visual cue, comprising:
   determining a gaze location of a first user wearing a first wearable device as an approximation in three dimensional space;
   transmitting the gaze location to a second user wearing a second wearable device;
   displaying to the second user, a gaze focus of the first user based on the determined gaze location, wherein the gaze focus is associated with a physical object distal to the first user in the three dimensional space, and wherein displaying the gaze focus of the first user to the second user further comprises computing and displaying an approximate physical distance between the physical object and the first user to the second user according to an extrapolation of the determined gaze location of the first user;
   geolocating the first and second users using Global Positioning System (GPS) receivers respectively integrated into each of the first and second wearable devices, wherein a geocoordination between the first and second users vary the gaze focus of the first user when displayed to the second user according to the geocoordination, the geocoordination performed by determining a locus of an eye of the first user and a relative distance of the second user to the first user, and computing a resultant locus of where the second user may view the gaze focus of the first user based on the determined locus of the eye of the first user with the determined relative distance of the second user to the first user; and defining a profile and security configuration for the first user to manage an access to the gaze location by the second user; wherein an eye-based gesture is performed by the first user to authenticate and enable the transmission of the gaze location to the second user upon the second user intersecting an eye direction of the first user.

2. The method of claim 1, further including triangulating the approximation in three dimensional space based on an angle calculated from observing a position of the eye of the first user.

3. The method of claim 1, wherein displaying the gaze focus to the second user further includes designating the gaze focus of the first user by a visible demarcation to the second user.

4. The method of claim 1, further including managing the displaying the gaze focus to the second user based on a gesture from the first user.

5. The method of claim 1, further including providing an additional data feed to users determined to be sharing the gaze focus at a particular time, wherein bidirectional communication is facilitated between the first user and each of the users determined to be sharing the gaze focus.

6. A system for facilitating communication between users sharing a visual cue, comprising:

a processor, that:

determines a gaze location of a first user wearing a first wearable device as an approximation in three dimensional space, transmits the gaze location to a second user wearing a second wearable device, displays to the second user, a gaze focus of the first user based on the determined gaze location, wherein the gaze focus is associated with a physical object distal to the first user in the three dimensional space, and wherein displaying the gaze focus of the first user to the second user further comprises computing and displaying an approximate physical distance between the physical object and the first user to the second user according to an extrapolation of the determined gaze location of the first user, geolocates the first and second users using Global Positioning System (GPS) receivers respectively integrated into each of the first and second wearable devices, wherein a geocoordination between the first and second users vary the gaze focus of the first user when displayed to the second user according to the geocoordination, the geocoordination performed by determining a locus of an eye of the first user and a relative distance of the second user to the first user, and computing a resultant locus of where the second user may view the gaze focus of the first user based on the determined locus of the eye of the first user with the determined relative distance of the second user to the first user, and defines a profile and security configuration for the first user to manage an access to the gaze location by the second user; wherein an eye-based gesture is performed by the first user to authenticate and enable the transmission of the gaze location to the second user upon the second user intersecting an eye direction of the first user.

7. The system of claim 6, wherein the processor triangulates the approximation in three dimensional space based on an angle calculated from observing a position of the eye of the first user.

8. The system of claim 6, wherein the processor, pursuant to displaying the gaze focus to the second user, designates the gaze focus of the first user by a visible demarcation to the second user.

9. The system of claim 6, wherein the processor manages the displaying the gaze focus to the second user based on a gesture from the first user.

10. The system of claim 6, wherein the processor provides an additional data feed to users determined to be sharing the gaze focus at a particular time, wherein bidirectional communication is facilitated between the first user and each of the users determined to be sharing the gaze focus.

11. A computer program product for facilitating communication between users sharing a visual cue by a processor, the computer program product comprising a non-transitory computer-readable storage medium having computer-readable program code portions stored therein, the computer-readable program code portions comprising:

an executable portion that determines a gaze location of a first user wearing a first wearable device as an approximation in three dimensional space;

an executable portion that transmits the gaze location to a second user wearing a second wearable device;

an executable portion that displays to the second user, a gaze focus of the first user based on the determined gaze location, wherein the gaze focus is associated with a physical object distal to the first user in the three dimensional space, and wherein displaying the gaze focus of the first user to the second user further comprises computing and displaying an approximate physical distance between the physical object and the first user to the second user according to an extrapolation of the determined gaze location of the first user;

an executable portion that geolocates the first and second users using Global Positioning System (GPS) receivers respectively integrated into each of the first and second wearable devices, wherein a geocoordination between the first and second users vary the gaze focus of the first user when displayed to the second user according to the geocoordination, the geocoordination performed by determining a locus of an eye of the first user and a relative distance of the second user to the first user, and computing a resultant locus of where the second user may view the gaze focus of the first user based on the determined locus of the eye of the first user with the determined relative distance of the second user to the first user; and an executable portion that defines a profile and security configuration for the first user to manage an access to the gaze location by the second user; wherein an eye-based gesture is performed by the first user to authenticate and enable the transmission of the gaze location to the second user upon the second user intersecting an eye direction of the first user.

12. The computer program product of claim 11, further including an executable portion that triangulates the approximation in three dimensional space based on an angle calculated from observing a position of the eye of the first user.

13. The computer program product of claim 11, further including an executable portion that, pursuant to displaying the gaze focus to the second user, designates the gaze focus of the first user by a visible demarcation to the second user.

14. The computer program product of claim 11, further including an executable portion that manages the displaying the gaze focus to the second user based on a gesture from the first user.

15. The computer program product of claim 11, further including an executable portion that provides an additional data feed to users determined to be sharing the gaze focus at a particular time, wherein bidirectional communication is facilitated between the first user and each of the users determined to be sharing the gaze focus.

* * * * *